March 7, 1961 C. F. KAEGEBEIN 2,973,741
HEN HOUSE FLOORING
Filed Feb. 12, 1959

INVENTOR.
CARL KAEGEBEIN
BY
Bean, Brooks, Buckley & Bean.
ATTORNEYS

United States Patent Office 2,973,741
Patented Mar. 7, 1961

2,973,741

HEN HOUSE FLOORING

Carl F. Kaegebein, Long Road, Grand Island, N.Y.

Filed Feb. 12, 1959, Ser. No. 792,863

4 Claims. (Cl. 119—22)

My invention relates in general to flooring and in particular to spaced slat flooring for hen houses.

As is well known to thoses killed in the art, it is desirable to have the flooring of hen houses of slat members spaced so as to permit the droppings to fall through but to provide adequate support for the fowl and the caretaker.

The principal object of my invention has been to provide a slat flooring for hen houses which is inexpensive to manufacture and simple to assemble.

Another object is to provide a flooring of this nature which is self cleaning and upon which droppings will not accumulate.

A further object is to provide a flooring, the slats of which are held in spaced relation by means of a strip of standard wire mesh.

Moreover, my flooring is light in weight and is easy and convenient to ship.

Furthermore, broken slats of my flooring may be conveniently and simply replaced.

The above objects and advantages have been accomplished by the device of the accompanying drawing of which:

Figure 1:
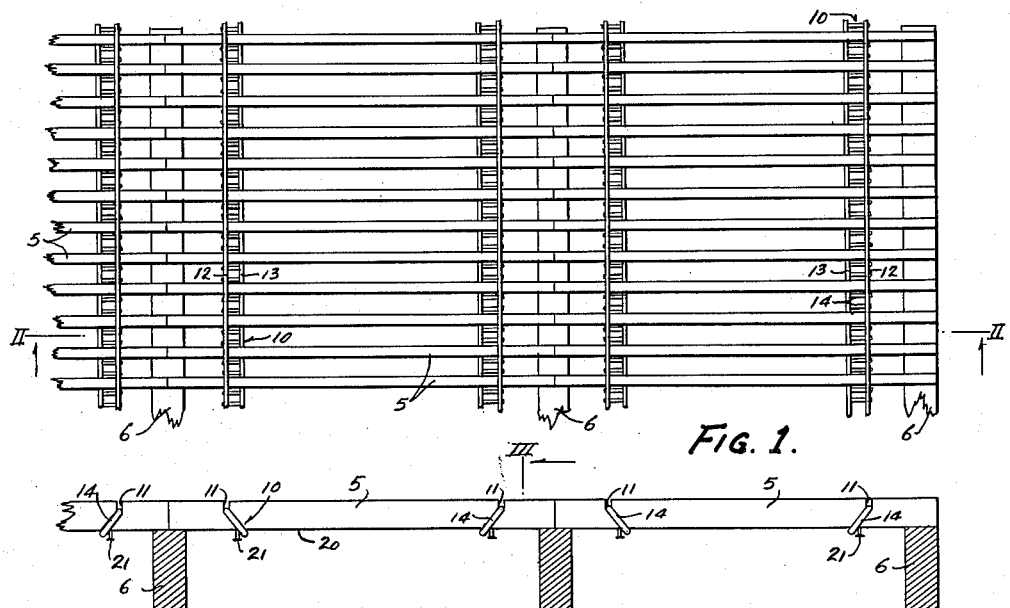
Fig. 1 is a plan view of the fragmentary portion of a complete flooring, embodying my invention.
Figure 2:
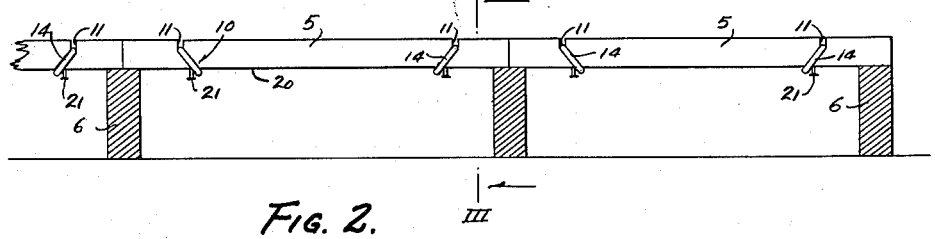
Fig. 2 is a side sectional elevation, taken on line II—II of Fig. 1.
Figure 3:
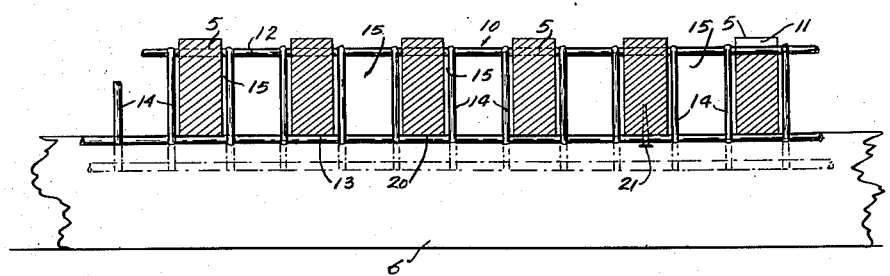
Fig. 3 is an enlarged fragmentary sectional view taken on line III—III of Fig. 2; and, Fig. 4 is an enlarged fragmentary sectional view taken on line II—II of Fig. 1.
Figure 4:
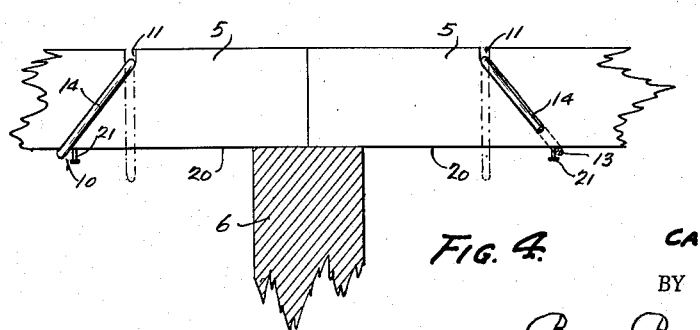

The flooring of my invention comprises a number of slats 5, supported preferably by a series of cross members 6. The slats are held in spaced relation by strips of wire mesh 10 extending laterally across the slats and preferably near the ends thereof. The wire mesh is of such a size as to accommodate the passage of the slats 5, and a slot or notch 11 is formed in the upper surface of each slat near each end thereof. The strip of wire mesh 10 comprises an upper transverse longitudinal member 12 and a lower transverse longitudinal member 13 joined by a series of spaced lateral wires 14. The space between the upper and lower longitudinal members is greater than the height of the slats, thus permitting the lateral wire to assume an angle with the longitudinal dimension of the slats when clamping. The width of the slats is slightly less than the space between the lateral wires to facilitate assembly. When assembling the flooring, the slats are passed through each alternate space 15 between the lateral wires or cross members 14. The grooves of the adjacent slats at each end thereof are brought into engagement with one of the upper longitudinal members 12 of the mesh, as shown by the dot and dash lines in Figs. 3 and 4. The depth of the notches 11 is such that the engaging longitudinal wire is well below the top surface of the slat. When the wire 12 is so engaged with the slots 11, the bottom longitudinal wire 13 is rotated about the wire 12, as shown in Fig. 4 to a position where it will engage the lower surface 20 of the slat and, therefore, be clamped snugly to the slat. When in this position a nail or tack 21 is driven into the bottom surface 20 of the slats behind the wire 13 at a number of places in the length thereof to keep the wire mesh in its clamped position. When the strip of wire mesh is thus assembled to the adjacent slats it will be obvious that the slats will be held in relatively rigid manner between the wires of the mesh so that each floor unit may be handled without fear of falling apart.

When and if a slat should break and the need of replacement occur, it is possible to spring the wire mesh sufficiently to release the broken slat unless the broken slat has one of the detent nails in which case the nail will first be removed. If it is found more convenient, the relatively few nails used may be removed and the strip of wire mesh moved to the position shown in the dot and dash lines of Fig. 4, whereupon the broken slat may be removed from the wire mesh and replaced by a new slat without having to disassemble any of the other parts of the flooring.

From the foregoing it will be obvious that in carrying out my invention the slats 5 are first cut to size and are then notched in the upper edges thereof near the ends as at 11. Strips of wire mesh are then prepared and the slats are assembled in the spaces between the upper and lower longitudinal wires 12 and 13 of the mesh, respectively, and preferably between each alternate space between the lateral wires 14. The upper longitudinal members 12 are placed in engagement with the notches 11 cut in the upper edges of the slats and the mesh is then moved or rotated about the notches as a pivot unit the lower longitudinal wires 13 are drawn into clamping contact with the lower edges of the slats whereupon they are fastened in this position by driving a number of nails 21 behind the lower longitudinal wire.

Instead of nails driven into the bottom surfaces of the slats to hold the wire mesh in clamping position, a helical spring may be attached to each pair of wire meshes near the ends thereof to draw the lower longitudinal wires tightly in clamping contact with the lower surfaces of the slats. These and other modifications of the details herein shown and described may be made without departing from the spirit of my invention or the scope of the appended claims.

Having thus described my invention, what I claim is:

1. A hen house flooring, comprising a plurality of spaced slats arranged parallel to each other, a plurality of wire mesh strips carried by said slats and extending at an angle thereto, each of said strips having an upper longitudinal member and a lower longitudinal member in spaced relation with each other, a plurality of spaced lateral members permanently connected to said longitudinal members and forming fixed openings therebetween, the vertical dimension of said openings being greater than the height of said slats to facilitate assembling, said slats being disposed in alternate openings of said strips and each being formed with spaced slots in its upper surface for engaging and supporting said upper longitudinal members, said strips being rotatable about said slots and said lower longitudinal members being movable into clamping relation with the lower surfaces of said slats by the rotation of said strips, and detent means carried by said slats and engaging the lower surfaces thereof, said detent means abutting against said lower longitudinal members to hold said strips in clamped position upon said slats.

2. A hen house flooring, comprising a plurality of spaced slats arranged parallel to each other, a plurality of wire mesh strips carried by said slats and extending at an angle thereto, each of said strips having an upper longitudinal member and a lower longitudinal member in spaced relation with each other, a plurality of spaced lateral members permanently connected to said longitudinal members and forming fixed openings therebetween, the vertical dimension of said openings being greater than the height of said slats to facilitate assembling, said slats being disposed in alternate openings of said strips and each being formed with spaced slots in its upper surface for engaging and supporting said upper longitudinal members, means for supporting the ends of said slats independently of said strips, said strips being rotatable about said slots and said lower longitudinal member being movable into clamping relation with the lower surfaces of said slats by the rotation of said strips, and detent means carried by said slats and engaging the lower surfaces thereof, said detent means abutting against said lower longitudinal members to hold said strips in clamped position upon said slats.

3. A hen house flooring, comprising a plurality of spaced slats arranged parallel to each other, a plurality of wire mesh strips carried by said slats and extending at an angle thereto, each of said strips having an upper longitudinal member and a lower longitudinal member in spaced relation with each other, a plurality of spaced lateral members permanently connected to said longitudinal members and forming fixed openings therebetween, the vertical dimension of said openings being greater than the height of said slats to facilitate assembling, said slats being disposed in alternate openings of said strips and supporting the upper longitudinal members thereof, said strips being rotatable about said upper longitudinal members and said lower longitudinal members being movable into clamping relation with the upper and lower surfaces of said slats by the rotation of said strips, and detent means carried with said slats and engageable with said strips for holding said strips in clamped position upon said slats.

4. A flooring for a hen house or the like comprising, a plurality of spaced slats arranged in substantially parallel relationship, said slats having alined notches in one of their edges, a first transverse member engaged in said slats, a second transverse member engaging the opposite edges of said slats and offset with respect to said first transverse member, cross members interconnecting said transverse members, there being one of said cross members adjacent each side of said slats, and means on said slats engaging said second transverse member to hold the same in fixed position.

References Cited in the file of this patent

UNITED STATES PATENTS 813,317    Murray _____ Feb. 20, 1906

FOREIGN PATENTS 680,736    Great Britain _____ Oct. 8, 1952